United States Patent [19]

Myrick

[11] Patent Number: 4,489,591
[45] Date of Patent: Dec. 25, 1984

[54] ANGLE OF AIRFLOW VANE POSITIONER

[75] Inventor: Charles C. Myrick, Auburn, Wash.

[73] Assignee: The Boeing Company, Seattle, Wash.

[21] Appl. No.: 429,874

[22] Filed: Sep. 30, 1982

[51] Int. Cl.³ .............................................. G01C 25/00
[52] U.S. Cl. .................................. 73/1 E; 73/432 V;
73/865.9
[58] Field of Search ............................. 73/1 E, 432 V;
324/158 SY

[56] References Cited
U.S. PATENT DOCUMENTS 2,473,682  6/1949  Harris et al. .................. 324/158 SY
2,859,621 11/1958  Knopf et al. ..................... 73/432 V
3,478,569 11/1969  Aichinger ............................. 73/1 E
4,235,103 11/1980  Carter et al. ..................... 73/432 V Primary Examiner—S. Clement Swisher
Attorney, Agent, or Firm—Conrad O. Gardner; Bernard A. Donahue; Nicolaas DeVogel

[57] ABSTRACT

A remotely controlled system for mechanically positioning an aircraft airflow vane for the purpose of calibration wherein a stepper motor drives the vane to a predetermined position in response to electronic system control disposed at a point remotely located with respect to the aircraft airflow vane.

2 Claims, 3 Drawing Figures

ANGLE OF AIRFLOW VANE POSITIONER

The present invention relates to methods and apparatus for calibrating the angle of airflow vanes of an aircraft, and more particularly to a remotely controllable device for mechanically positioning an aircraft airflow vane for the purpose of calibration thereof.

Heretofore the patent literature, viz., U.S. Pat. No. 2,473,682, is seen to be illustrative of an angle measuring mechanism for calibrating a rudder and an elevator of an aircraft or guided missile, or the like. In U.S. Pat. No. 2,473,682 the rudder and elevator are removed and replaced by motor-driven electrical potentiometers. The potentiometers are designed to impose on the system exactly the same mechanical load as the member it replaces and to be operated by the system to select potentials corresponding to the positions which the member itself would assume under control of the same applied signal. This feature of removing a member and replacing it with a potentiometer may be contrasted with the present angle of airflow vane positioner system which directly drives the device with which it was designed to operate.

Angle of airflow vanes in aircraft are well known devices which protrude from the sides of the aircraft and which measure the angle of the airflow with respect to some zero reference such as the aircraft centerline. Heretofore calibration has often been done manually. In contrast, the present angle of airflow vane positioner system includes means fastened to the side of the aircraft at the airflow vane position for driving the vane to any desired position and calibrating its position through circuit means coupled thereto downstream.

It is accordingly an object of the present invention to provide an angle of airflow vane positioner system for controlling the airflow vane position and driving the vane to any predetermined position through a remotely located control circuit for calibration purposes.

It is yet another object of the present invention to provide a remote control and positioning of angle of airflow during checkout of aircraft at the preflight checkout.

It is a further object of the present invention to provide an angle of airflow vane positioner for controlling a plurality of vanes simultaneously.

It is still another object of the present invention to provide computer control and remote control of air vane positioned for other angle sensor device positioning and calibration thereof.

It is still a further object of the present invention to provide means for slewing aircraft airflow vanes to desired angles at rates of 1 to 9 degrees per second in increments of 1.0 degrees per second.

In accordance with a preferred embodiment of the invention, an angle of airflow vane positioner system comprises a vane positioner head, and a controller, hand-held terminal, and remote computer/controller coupled thereto.

A full understanding of the present invention, and of its further objects and advantages and the several unique aspects thereof, will be had from the following description when taken in conjunction with the accompanying drawings in which.

Figure 1:
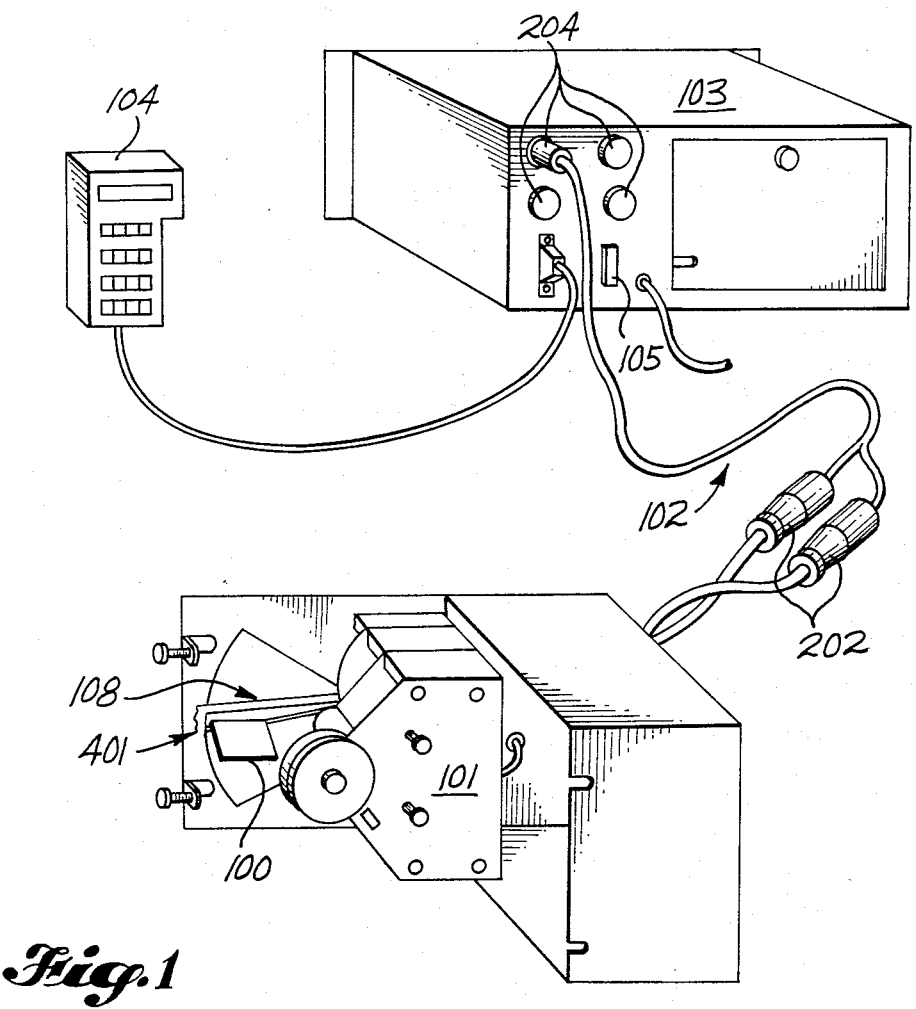
FIG. 1 is a perspective view of the present system apparatus showing vane positioner head, controller of electronics, hand-held terminal, remote computer/controller and interconnecting cables deemed helpful in an initial overview of the present system.

Turning now to FIG. 1 and an overview of the present angle of airflow vane positioner system, there is seen a vane positioner head 101, interconnecting cables 102 (which include connectors 202), controller electronics housing 103 for housing the remote computer/controller, and hand-held terminal 104.

First a brief description of the function of the (angle of the airflow) AOA vane 100 is believed in order. AOA vane 100 is utilized to sense the relative angle of airflow across the fuselage of an aircraft to generate a stall warning signal. AOA vane 100 is also utilized to correct the air data readings from the pitot probes since their readings are proportional to the cosine of the angle of airflow. When AOA vane 100 is located on the underside of the aircraft, it is utilized for measuring sideslip, or crabbing of the aircraft.

Figure 2:
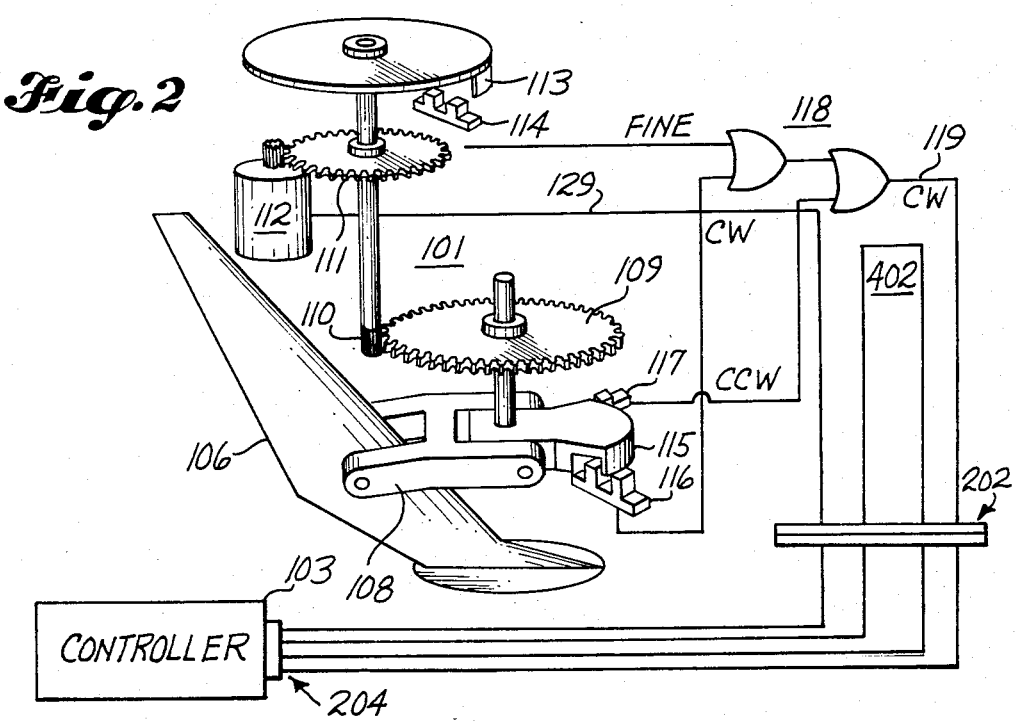
FIG. 2 is a partial system and block diagram schematic of the present angle of airflow vane positioner system; and, FIG. 3 is a schematic diagram of the controller shown in FIG. 2.
Figure 3:
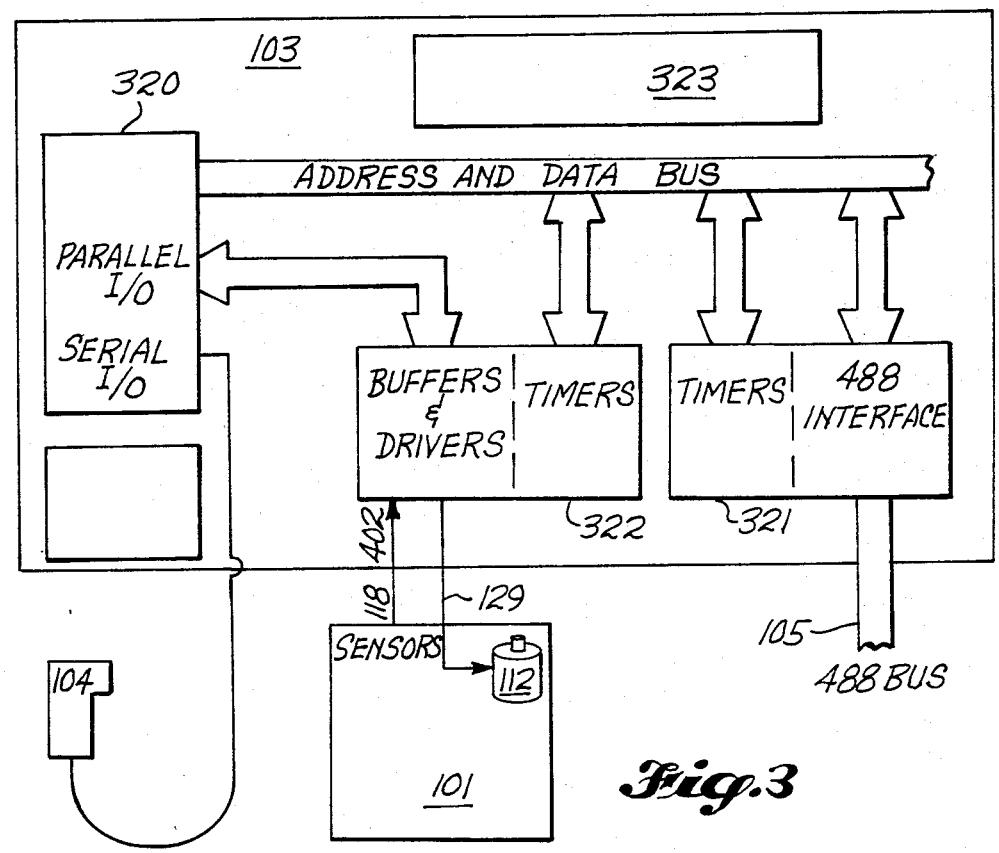

In either case, it is necessary to check the calibration of the various pieces of equipment that receive the signals from AOA vane 100. For example, the stall warning detection system is required to be checked at several angles to simulate several different airspeeds, and to ensure that the warning system does not go off prematurely, or, on the other hand, that the system is not sensitive enough. Heretofore, as hereinbefore mentioned, a mechanical protractor has been mounted to the body of the AOA vane sensor. In the prior art, whenever a different angle is needed as the tests progress, an operator was required to climb up a ladder, or an aerostand to set the protractor to the different angles that were required to be checked. The present system pertains to an electrical positioning method wherein multiple control heads 101 may be utilized, and which are fastened to AOA vane sensors, e.g., as shown at 106 in FIG. 2. A plurality of airflow vane positioner control heads 101, shown in FIG. 1, may be connected to a plurality of AOA vane sensors, the control heads then being connected to the controller 103, viz., at connectors 204 (one control head 101 being shown merely for purposes of illustration in FIG. 1). Controller 103 may in a first mode be operated by hand-held terminal 104 or through a computer control network by means including a standard IEEE 488 data bus shown at 105 in FIGS. 1 and 3. The computer circuitry in controller 103 seen in FIGS. 1, 2 and, in more detail, in FIG. 3 provides the controller commands for positioning any or all of the positioner heads 101 to a different angle. The computer control network connected to IEEE 488 data bus connector 105 or the hand-held terminal 104 may also question the current position of the heads (and consequently the AOA vanes) and thus function without the requirement of an operator climbing up to take a visual observation of the AOA vane 100, or make adjustments to the protractor and vane.

Turning now to a description of vane positioner head 101 wherein vane positioner head 101 can be seen fastened to angle of airflow vane sensor 106 generally mounted on the side of an aircraft, the observation must be made that angle of airflow vane sensor 106 may also be mounted on the underside portion of the aircraft. In any event, vane positioner head 101 comprises either a spring loaded pin 401 to engage a hole in the back of the vanes, an arm 108 to reach out to the back of the vane as in the case of a spring loaded pin or to contact the front of the vane as actually shown in FIG. 2. A gear train (109, where 109 is an anti-backlash gear, 110, and 11), a stepper motor 112, a fine interrupting vane 113, a fine optical coupled interrupter 114, a coarse interrupting vane 115, and coarse optical coupled interrupters 116 and 117 provide output signals termed fine, CW, and CCW which when combined in logic circuit 118 are utilized to give a CW (clockwise) signal 119 representative of vane positioning at a positive or negative angle. Clockwise signal (CW 119) is utilized to instruct the microprocessor in controller 103 where zero location is during initialization. Subsequent to initialization, the microprocessor keeps track of the angle by counting the number of steps it has commanded, direction being taken into consideration. However, CW signal 119 is compared with the sign of the angle as counted by the microprocessor in commanding steps to stepping motor 112. If an error is discovered, indicating that vane positioner head 101 has slipped, the microprocessor indicates a failure on both hand-held terminal 104 and over 488 data bus 105 upon head position inquiry. Also provided is a continuity signal 402 to signal the presence of a head to the microprocessor.

Turning now to vane positioner controller circuit 103 shown in FIG. 3, it can be seen that vane position controller circuit 103 includes a microprocessor card 320, 488 interface card 321, and vane interface card 322. Vane position controller 103 also includes as shown for reference purposes a power supply 323 for powering the logic circuits shown in FIG. 3.

In the operation of controller circuit 103, shown in FIG. 3, it should be noted that upon turning on of power 323, or following a reset from data bus 105, microprocessor circuit 320 looks at each vane positioner head channel to see which, if any, positioner heads are connected as inputs to the system. For those channels where positioner heads are connected, microprocessor 320 then looks at clockwise signal 119, (the combined optical interrupter signal from that head to determine which side of zero the control arm 108 driving the AOA vane 106 is currently set on). Controller circuit 103 then provides pulses 129, as seen in FIGS. 2 and 3, to stepping motor 112 representative of a direction that will drive vane 106 toward the zero position. Before each step to stepping motor 112 is commanded, the microprocessor 320 examines the signal again to determine if it has crossed over the zero point. When signal 119 from control head 101 is representative of vane cross-over the zero point, processor circuit 320 zeros its internal position and then slows down the speed of control head 101 to zero, then stepping slowly back to the zero position.

Upon command of an angle, controller 103 commands stepper motor 112 to advance AOA vane 106 to that position. Before issuing each step command to the stepping motor 112, controller circuit 103 re-examines the signal from the zero sensors. If there is any disagreement between the sign of the angle stored in microprocessor 320, and the sign of the angle sensed by the optical zero sensors, a FAILURE is indicated to both hand-held terminal 104, and when the angle is queried, over data bus 105, again a FAILURE is indicated.

488 data bus 105 interface card 321 provides all of the handshake as set out by IEEE (Institute of Electrical and Electronic Engineers) 488 data bus specifications, and interrupts microprocessor 320 to provide or fetch data from the microprocessor card as necessary. If the position of a channel is queried where no vane positioner head 101 is connected, microprocessor 320 responds with the message NO HEAD ON #, where # is the queried channel. This is done both over 488 data bus 105 or hand-held terminal 104.

Vane positioner head interface card 322 includes buffers as shown for the zero position data coming from the positioner heads, and also the power amplifiers for driving the respective stepping motors. Also included as shown is a timer integrated circuit chip and associated address decoder logic so that a total of up to 4 positioner heads 101 may be controlled simultaneously although the present system block diagram as shown in FIG. 3 could be expanded to control more than 4 angle position sensors 101. The remainder of the timer chips required are on the 488 interface card shown in 488 data bus interface card 321.

Minimal logic and hardware are utilized for control of the heads as shown in the controller circuit 103 of FIG. 3, all of the ramping counting, etc. being done in microprocessor 320.

Significant advantages and features of a working embodiment of the present system included the following:

1. The angle of airflow vane positioner system can be remotely controlled by a hand-held terminal 104:
    i. Inputting both position and rates via the hand-held terminal.
    ii. Displaying position of vanes on hand-held terminal.
    iii. Giving both rate and final desired position, and then giving a 'go' command to start the ramp to the desired final position.
2. The angle of airflow vane positioning system can be remotely controlled through the IEEE 488 data bus 105:
    i. Commanding rate and desired final position.
    ii. Querying the position at any given time.
    iii. Giving a 'go' to start the ramping to the desired position, through either.
    iv. Resetting the 0 degrees by selective device clear, or universal, device clear.
3. The present angle of airflow vane positioning system will simultaneously:
    i. Control up to 4 vanes at a time.
    ii. Command vanes at angles from −40.0 to +40.0 degrees in 0.1 degree increments.
    iii. Slew vanes to desired angles at rates of 1 to 9 degrees per second in increments of 1.0 degrees per second.
    iv. Self check heads when crossing through 0 degrees and flag if errors have occurred.
    v. Display a warning if a head becomes disconnected.
    vi. Recalibrate head when reconnected.
4. Software is written to control:
    i. Ramp up and ramp down of stepper motors in the head.
    ii. Rate and/or final value may be changed independently of each other.
    iii. If no value is put in after commanding final value, default rate is 9 degrees/Sec.
    iv. If "F" for Final value is entered, default if 000.0 degrees and only leading non-zero digits need be entered.
    v. Invalid entries, and entries outside the acceptance range are ignored.

vi. Each head is loaded independently. Only the last one is displayed.

vii. After a "Go", the present value, actual rate, and final desired value are displayed for the last head addressed. For other inputs, the desired rate is displayed.

What is claimed is:

1. A system for measuring the angle of airflow of an airflow vane in an aircraft comprising in combination:
    a vane positioner head including a control arm coupled to the airflow vane;
    a controller circuit;
    a gear train and stepper motor coupled between said control arm and said controller circuit;
    a logic circuit having a plurality of input terminals, and an output terminal for providing a clockwise signal representative of positive or negative angle positioning of said vane;
    a fine interrupting vane and a coarse interrupting vane coupled to said gear train;
    a first optical coupled interrupter coupled between said fine interrupting vane and a first of said plurality of input terminals;
    second and third optical coupled interrupters coupled between said coarse interrupting vane and second and third of said plurality of input terminals; and,
    means for coupling said clockwise signal representative of positive or negative angle positioning of said vane to said controller circuit.

2. A vane positioner head for coupling to an airflow vane comprising:
    a control arm having connecting means for coupling said control arm to the airflow vane;
    means including a coarse interrupting vane for coupling said control arm to a gear train; and,
    fine and coarse optical coupled interrupters responsive to positioning of said vane for providing clockwise indicating output signal.

* * * * *